3,122,493
METHOD OF PETROLEUM RECOVERY FROM MINERAL AGGREGATES

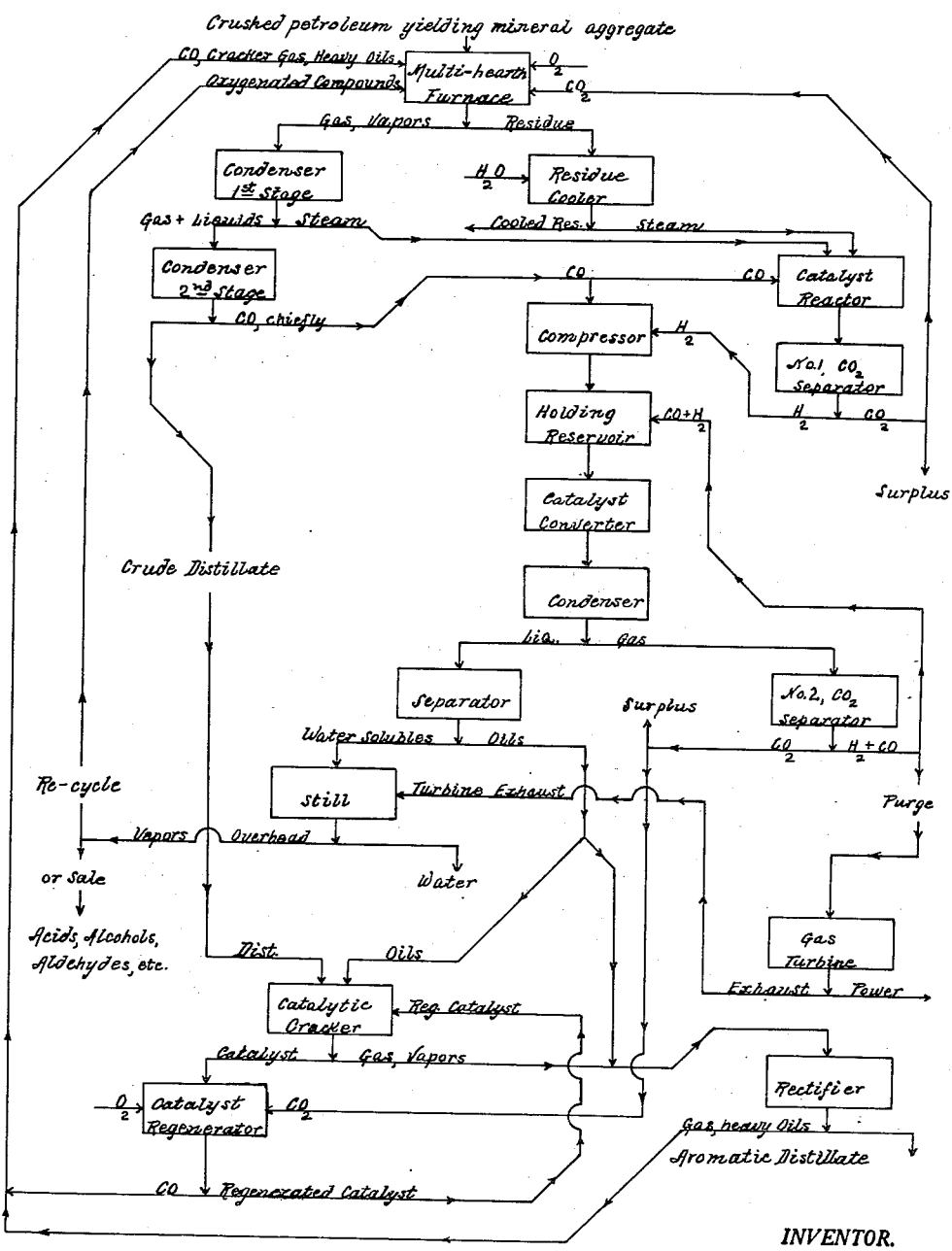

Alfred M. Thomsen, 265 Buckingham Way, Apt. 402, San Francisco 27, Calif.
Filed May 8, 1961, Ser. No. 118,216
13 Claims. (Cl. 208—9)

My process deals with ways and means of recovering petroleum from such materials as oil sands, oil shales, diatomaceous earths, and asphalts, but where the viscosity of the products prohibits flow to an oil well when such a well is drilled. It also deals with the production of petroleum products from strata that do not contain oil as such but which will yield oil when subjected to a destructive distillation. Such material as the latter are often referred to under the misnomer of "oil shales" but that is diverse from the former use of said name where oil is assumed to be actually present in the rock so named. In addition, such strata are often interbedded with layers of rock that contain much carbon and even with coal and lignites.

Numerous deposits of such material are well known as they are either exposed or but thinly covered with barren material so they may be mined very cheaply by open pit work. But when it is planned to use only selected material from such deposits the cost of mining can become prohibitive. It is, therefore, my plan to take such a deposit "as is" and to make some use of all the resident carbon. Furthermore, it is almost axiomatic that much sulphur will also be present, in part as organic sulphur compounds, and in part as mineral sulphides, principally iron. The reclamation of such sulphur in useful form is likewise a part of my process. I wish to state here that I do not present any new chemical reactions in my disclosure. The reason why such well known deposits are not now operative is purely a matter of economics, not lack of chemical knowledge. It is the manner in which I have used such information that constitutes my process.

It is true that there are deposits very much favoring one or the other of these types but to make a "preferred" illustration one that will show forth all steps involved I will assume that all such types are present in that set forth in my drawing, which I will now explain in full.

I first crush the crude rock fine enough to permit its mechanical handling in a state of continuous flow, say, through a 4 mesh sieve. I then submit said product to distillation using for my purpose a conventional multi-hearth, or multiple hearth, furnace such as used in ore roasting. For my purpose I will assume that said furnace has twelve hearths, the ore entering the uppermost division and passing downward through all hearths. Elemental oxygen is admitted on the lowermost hearth to consume the carbon left in the mineral after distillation which, in general, will be finished by about the eighth hearth and the oxygen will at the same spot have been consumed as well. Distillation, therefore, is effected by the hot carbon monoxide produced in the carbon-oxygen reaction. Gas and vapors produced is the distilling phase will thus commingle with the carbon monoxide produced in the combustion phase and the mixture leaves the top of the furnace to go to a condenser. If too much carbon be present after distillation to produce the essential heat, about 1200° F., then the temperature is moderated by commingling the oxygen with carbon dioxide produced at a later step, said carbon dioxide being, of course, reduced to the monoxide with consequent lowering of the temperature.

In the event that a deficiency of carbon be experienced then I have indicated other sources of heat in re-cycled heavy oils, oxygenated chemicals, and hot carbon monoxide from the regeneration of a catalyst used later on, as well as gas from a catalytic cracking of intermediate products. All such material fed to the furnace operation being described add to the carbon balance and ultimately escape as a portion of the gas and vapors leaving said furnace, chiefly converted to carbon monoxide but with some supplementary hydrogen. Because of the need of all carbon placed by nature in the deposit to accomplish my end it is essential that a cracking step of some sort be made an integral part of my process.

In addition to the gas and vapors leaving the furnace I have shown the "solids" which, of course, are very hot entering a "cooler" where they are contacted with finely atomized water while in an agitated state, said water flashing at once into steam and reducing the temperature of the solid rock residue to slightly above the boiling point of water. In this manner I generate a part of the steam subsequently needed which is used at atmospheric pressure. Such economies are absolutely necessary to my process.

Turning now to a description of the condensation of the volatiles from the furnace it will be seen that I effect that in two stages. In the first stage condensation is incomplete, the temperature being held at some 50° C. above the boiling point of water. In this manner I exchange the major part of the sensible heat resident in the gas and vapors from the furnace for evaporative effect on water and thus generate the remaining amount of low pressure steam that my process subsequently requires. From the first stage the partially condensed vapors and non-condensible gas pass into the second stage where condensation is complete, liquid products and non-condensable gas, respectively, issuing from said condensation phase. The liquid product is a very crude distillate, high in carbon and sulphur, whose further treatment will be described later on. The gaseous product is essentially carbon monoxide with some hydrogen, the latter produced in the distilling phase and, partly, due to the re-cycled products before described.

On the drawing I have shown this gaseous product split in two streams, one going directly to a compressor and the remainder to a "catalyst reactor." In this device the steam previously produced is commingled with said gas and passed over a suitable catalyst for the production of hydrogen. This is the exothermic, conventional, process, generally using ferric oxide as the catalyst, so commonly used that no explanation is necessary. The reacted gas passes into "No. 1, $CO_2$ separator" which is equally conventional for removal of the $CO_2$ formed in the reactor. I have indicated an optional use of a part of this $CO_2$ as a re-cycle stream to the furnace as previously described. The hydrogen, thus purified is commingled with the carbon monoxide, with a little hydrogen, already referred to as feed for the compressor. While not represented on the drawing, it is obvious that hydrogen sulphide will be extracted in the same manner as the $CO_2$ for future use.

It will be self-evident that the ratio between hydrogen and carbon monoxide in the compressor feed is entirely regulated by the amount of said carbon monoxide diverted to this hydrogen exchange phase, hence is under the direct control of the operator. The importance of this step will be evident later on. From the compressor the mixed gases enter a holding reservoir maintained at any desired pressure from 10 atmospheres to 40 atmospheres. Personally I favor the former pressure and a gas composition equivalent to conventional water gas.

From the reservoir the gas passes through the "catalyst converter" which can contain the old fashioned cobalt catalyst but I prefer iron oxide reduced by hydrogen, particularly reduced at a temperature below 1000° F.

In standard practice this was always iron ore, because of its availability and cheapness, but here I make a very definite departure. I use a catalyst made by taking some form of adsorbent silica, like a completely dehydrated silica gel or a silica residual from the acid treatment of a complex mineral silicate, and proceeding in the following manner. Said silica has a high power for adsorbing ammonia gas which according to the laws of adsorption supposedly coats the high internal area of said silica with a film of dense ammonia. After such saturation the silica is submerged in a solution of an iron salt and a layer of iron hydroxide is substituted for the ammonia. Subsequent washing removes the ammonium salt formed and drying removes the water preparing the resultant coated silica for the hydrogen reduction above specified. The result is an iron catalyst entirely diverse from anything that I have seen used in the catalytic operation now to be described.

The converter is a fluidized bed, which is old and well known, but with the catalyst I have described it transforms the reaction amazingly. Of course, just what does take place in the hydrogenation of carbon monoxide is known to no one. Suffice to say, an oily mixture of hydrocarbons is one product and a water solution of alcohols, organic acids, and aldehydes is another product. A part of the resident carbon is oxidized to carbon dioxide, and the residual gas becomes enriched in hydrogen. All this takes place in an exothermic reaction and the removal of such heat is mandatory as the converter temperature is best held between 200° C. and 400° C.

From the converter the gases and vapors formed therein pass to a "condenser" which not only removes heat but also cleans the gas stream by a scrubbing action such as is conventional in most petrochemical endeavors. Said condenser yields two products, one liquid the other gas. Obviously said condenser is under converter pressure so it takes a minimum of power to re-cycle this clean gas back to the converter. However, it is a distinct advantage to remove the carbon dioxide first so I have indicated "No. 2, $CO_2$ separator" as the device performing such service. A portion of said separated carbon dioxide may be re-cycled to the furnace as a control feature, the balance being marked as "surplus."

Of course, this entire hydrogenation of carbon monoxide is only the well known Fischer-Tropsch process so there is no need to describe any step more fully. It is assumed that the operator is entirely conversant with such matters as well as the American additions to the same. The only important thing is the TREND of the various reactions. The object in the instant application is to form as much of the oily fraction as possible without regard to any separation into constituent parts. It is also assumed that such an economic crime as the re-cycling of the water soluble fraction to the furnace is justified by the desire to have but one product leaving the field, namely, a petroleum type product reasonably high in aromatics and of such character that it will require but little further processing to yield acceptable products. To achieve this end all that need be said is to mention the well known fact that low pressures and low temperatures further an increase in said oily fraction with a consequent diminished ratio of the oxygenated compounds. To keep a relatively low temperature in the converter requires nothing save a high rate of re-cycling of the cold gas leaving No. 2, $CO_2$ separator. Pressure is evidently optional. While not on the drawing, to avoid confusion, it is obvious that if the condenser were made two-stage, as the one previously described, then the heat so abstracted would deliver its quota of low pressure stream of which a tremendous excess is mandatory in the "catalyst reactor" for the production of the essential hydrogen.

The liquid product from the "condenser" is next passed to a separator where the oily matters are separated from the watery constituent. This may be done by settling or by the centrifuge. The oily item is then shown commingled with the "crude distillate" before obtained in the "catalytic cracker" where the naphthenes and paraffinoids are largely converted to aromatics with separation of both hydrogen and carbon, the latter fouling the catalyst, presumably of the silica-alumina type. The gas and vapors from this step pass to a rectifier which delivers gas and heavy oil as well as an accepted aromatic distillate. Both gas and heavy oil are shown as re-cycled to the furnace where further distillation, with coke separation, cracks the oil into lighter fractions and further decomposition of gas takes place, the final products appearing as vapors, hydrogen, and carbon monoxide in the gaseous material leaving the furnace.

The carbon-fouled catalyst is then shown going to a "regenerator" where said carbon is burned off by means of elemental oxygen, the violence of the reaction being controlled by optional use of carbon dioxide as it is inadvisable to permit the temperature to exceed 1100° F. The resultant hot carbon monoxide is then shown re-cycled to the furnace where its sensible heat aids in the distillation of the original mineral as well as furnishing a further quota of material for the subsequent gaseous step.

The "watery" condensate, separated from the "oily" fraction is then indicated as treated in a still wherein water is discarded and the overhead vapors are re-cycled to the furnace. If these substances could be sold instead, such a departure would be indicated, but if re-cycled it has completely closed the circuit, the only product being the final aromatic distillate previously referred to. Of course, this leaves out the wasted carbon dioxide which has been made in the process of making hydrogen and in the use of said hydrogen in that converter step wherein the synthetic hydrocarbons were produced. Approximately 25% of the total carbon in the raw material is consumed in this manner, the remainder, becomes linked with sufficient hydrogen to form the high gravity, on the A.P.I. scale, represented by the aromatic distillate.

Such complete re-cycling is not possible, however, as some nitrogen always remains with the "tonnage oxygen" used in combustion of carbon. In addition there are permanent gaseous bodies that do not enter into the chemical reactions indicated and are not broken down in the furnace owing to the temperature employed. It is, therefore, essential that a certain fraction of the circulating gas stream be continuously purged from the circuit. I have indicated that this be burned in a gas turbine furnishing all the power that the refinery needs and in addition a very hot exhaust, about 900° F. While relatively inefficient as a power source, converting only 25% of the heat value into energy, it has the advantage over high-pressure steam that all heat resident in the exhaust becomes available. I have shown this as used in the "still" operation previously referred to. Obviously, it can be used elsewhere as well.

The net of the foregoing is that such material, by plain distillation, will furnish only some 27 gals. of a 20°, high-sulphur oil per ton, a yield which will be non-remunerative. Contrariwise, if treated as herein described, the same amount of raw material will produce 45 gals. of a light 40° oil, or better, virtually sulphur free and high in aromatics. Such an alteration would render many dormant deposits of petroleum yielding minerals suitable for exploitation at the present time instead of regarding same merely as possible future oil reserves.

The question of sulphur will now be considered. While the catalyst selected as my favorite, namely reduced iron, is not too much effected by sulphur in the gas stream, the reverse is true if the original Fischer-Tropsch were substituted. It is also true that the ferric oxide used in the water-gas shift is similarly indifferent, nevertheless it is a good plan to remove all hydrogen sulphide possible from the gas stream. As already stated this is done by scrubbing with a suitable solvent of which many are in use but probably the ethanolamines are the best. That is a matter for individual preference as the procedure is entirely conventional. Obviously, a good place to insert said step is directly after the 2nd stage condenser. The hydrogen sulphide thus obtained may then be converted to sulphur or to sulphuric acid, but that is obviously outside the limits of this disclosure.

Many minor modifications suggest themselves on scanning this disclosure. On the drawing I have indicated that a portion of the synthetic oils obtained therein can be sent directly to the rectifier. This may be done as indicated. It is obvious that the low-boiling fraction of said addition will become a part of the accepted fraction, the remainder being re-cycled to the furnace instead of to the catalytic cracker where it more properly belongs. Such synthetic material does contain a large fraction within the gasoline range, but it would be better to rectify such material separately, send the heavy oil to the cracker and commingle the light fraction directly with the aromatic distillate. However, as the octane rating of such material is relatively low only a portion can be so used. Manifestly, I cannot show such alternatives on an illustrative drawing so I am making this observation in my text.

Another modification consists in using the "purge gas" in some other manner than the one indicated. That such gas will contain a substantial amount of nitrogen has already been said. It will be simple to add additional nitrogen from the air and to convert the resident carbon monoxide into hydrogen, as before described, to produce the proper ammonia ratio, i.e., 3 volumes of hydrogen to 1 volume of nitrogen. In this manner a large ammonia industry, which would often be welcome, can be superimposed upon the petroleum version.

The conventional manner of making a ferric oxide catalyst, such as I use in the water-gas shift, is to soak some porous substance in a solution of ferric nitrate. On calcination this leaves a well distributed form of ferric oxide. However, I prefer to take the catalyst extended upon the internal area of adsorbent silica, that I have already described in connection with the hydrogenation of carbon monoxide, but to ignite said material converting the deposited iron hydroxide to ferric oxide in place of the low temperature reduction to metallic iron by means of hydrogen gas. All such items I consider as having been fully disclosed and described in these specifications. Having thus fully described my process in the preferred version I have herein presented, I claim:

1. The method of petroleum recovery from petroleum yielding mineral aggregates which comprises; crushing such material to a suitable size; advancing it in counter-current flow against a gas stream heated to approximately 1200° F., said gas stream consisting essentially of carbon monoxide thus subjecting said aggregate to dry distillation forming vaporized petroleum products, which commingle with said gas stream, and a residual carbon, which remains in said mineral aggregate; forming said stream of heated carbon monoxide by commingling said dry distillation residue with elemental oxygen; condensing and separating the volatilized petroleum product from the gaseous components of said dry distillation thus obtaining a crude distillate and a gas consisting chiefly of carbon monoxide; separating said gas in two portions; reserving one portion for future use and commingling the other portion with steam and passing it over a suitable catalyst to promote the conversion of said carbon monoxide into carbon dioxide by interaction with said steam thus producing a mixture of sydrogen and carbon dioxide, removing said carbon dioxide and commingling the residual hydrogen with the reserved portion of said carbon monoxide gas; compressing the resultant mixture of hydrogen and carbon monoxde to a pressure of between 10 and 40 atmospheres and passing it at a temperature between 200° C. and 400° C. through a fluidized bed of reduced iron, said reduced iron coating the internal area of an adsorbent type of silica; condensing and separating as liquid the condensable portion of the reaction products leaving a residual permanent gas; separating the carbon dioxide formed in the last mentioned reaction from said permanent gas and then re-cycling said gas to the carbon monoxide-hydrogenation phase; separating the liquid portion obtained in said carbon monoxide-hydrogenation into a "watery" and an "oily" portion; commingling the "oily" portion with the crude distillate previously obtained in dry distillation and passing the mixture, in vaporized form, through a fluidized catalyst suitable to promote the conversion of the resident paraffinoids and naphthenes into aromatic compounds, with attendant deposition of carbon on said catalyst; condnsing and rectifying the resultant volatilized and gaseous compounds into an aromatic distillate, constituting the accepted fraction, a residual heavy oil and permanent gas; re-cycling both the oil and the gas, respectively, to the initial dry distillation phase of the process.

2. The method of petroleum recovery from petroleum yielding mineral aggregates set forth in claim 1, with the added step that the temperature of dry distillation prescribed therein be controlled by the admixture of carbon dioxide with the elemental oxygen employed therein.

3. The method of petroleum recovery from petroleum yielding mineral aggregates set forth in claim 1, with the added step that hydrogen sulphide, resident in the dry distillation gaseous components, be removed by scrubbing with a suitable solvent prior to the use of said gaseous material in the carbon monoxide-hydrogenation step.

4. The method of petroleum recovery from petroleum yielding mineral aggregates set forth in claim 1, with the added step that the temperature of the catalyst employed in the carbon monoxide-hydrogenation step be controlled by the rate of flow of the reacting gases passing through said catalyst.

5. The method of petroleum recovery from petroleum yielding mineral aggregates set forth in claim 1, with the added step that the carbon-fouled catalyst used in the catalytic cracking step be regenerated by the combustion of said carbon in commingled oxygen gas, the carbon monoxide thus produced being re-cycled to the dry distillation phase of the process thus utilizing its sensible heat in said distillation.

6. The method of petroleum recovery from petroleum yielding mineral aggregates set forth in claim 1, with the added step that the "watery" product separated from the condensed products of the carbon monoxide-hydrogenation step employed therein be distilled with the formation of a water reject and vaporized oxygenated organic compounds, the latter being re-cycled to the dry distillation step of the process.

7. The method of petroleum recovery from petroleum yielding mineral aggregates set forth in claim 1, with the added step that a portion of the circulating, re-cycled gas stream employed therein be consistently purged from the circuit thus avoiding the undue accumulation in said gas stream of unwanted gaseous components.

8. The method of petroleum recovery from petroleum yielding mineral aggregates set forth in claim 7, with the added step that the purge gas released therein be burned in a gas turbine, the exhaust from same furnishing the heat requisite for the distillation of the "watery" product obtained therein.

9. The method of petroleum recovery from petroleum yielding mineral aggregates set forth in claim 5, with the added step that the temperature of the combustion of the carbon prescribed therein be regulated by commingling carbon dioxide with the oxygen gas employed in said combustion.

10. The method of petroleum recovery from petroleum yielding mineral aggregates set forth in claim 1, with the added step that the catalyst employed in the carbon monoxide-hydrogenation step be made by saturating a dry form of adsorbent silica with ammonia gas, submerging said saturated silica in a water solution of an iron salt, washing the resultant product free from ammonia salts thus formed, drying the washed product and reducing the iron hydroxide film covering the internal area to metallic iron in a current of hydrogen gas at a temperature below 1000° F.

11. The method of petroleum recovery from petroleum yielding mineral aggregates set forth in claim 1, with the added step that the catalyst employed in oxidizing carbon monoxide by means of steam be made by saturating a dry form of adsorbent silica with ammonia gas, submerging saturated silica in a water solution of an iron salt, washing the resultant product free from ammonia salts thus formed, drying the washed product and heating in a current of air to convert the film of iron hydroxide coating the internal area of said silica into ferric oxide.

12. The method of petroleum recovery from petroleum yielding mineral aggregates set forth in claim 1, with the added step that the sensible heat in distillation residues resulting from the dry distillation prescribed therein, in excess of 212° F., be converted into latent heat of evaporation of water, said water vapor becoming a part of the steam requirements for the production of hydrogen.

13. The method of petroleum recover from petroleum yielding mineral aggregates set forth in claim 1, with the added step that the cooling of gas and vapors prescribed therein be effected in a two-stage operation, the first stage yielding steam, suitable for hydrogen production, accompanied by a partial cooling, the second stage producing complete cooling.

References Cited in the file of this patent

UNITED STATES PATENTS

| | | |
|---|---|---|
| 1,528,039 | Wolcott | Mar. 3, 1925 |
| 2,436,938 | Scharmann et al. | Mar. 2, 1948 |
| 2,702,814 | Riblett et al. | Feb. 22, 1955 |